(12) United States Patent
Dunwoody et al.

(10) Patent No.: US 6,238,462 B1
(45) Date of Patent: May 29, 2001

(54) METHODS FOR THE SEPARATION OF COMPOUNDS FROM ACIDIC AQUEOUS SOLUTIONS

(75) Inventors: Steven A. Dunwoody, Castle Hayne, NC (US); Lei Jiang; Dale R. Powers, both of Painted Post, NY (US); Freddie G. Prince, Accokeek, MD (US)

(73) Assignee: Corning Incorporated

( * ) Notice: Subject to any disclaimer, the term of this patent is extended or adjusted under 35 U.S.C. 154(b) by 0 days.

(21) Appl. No.: 09/353,202

(22) Filed: Jul. 14, 1999

(51) Int. Cl.⁷ .................................................. B01D 53/14

(52) U.S. Cl. ................................ 95/195; 95/205; 95/210; 95/234

(58) Field of Search ............................. 95/234, 230, 210, 95/213, 205, 206, 188, 189, 187, 195, 196, 199, 186

(56) References Cited

U.S. PATENT DOCUMENTS

| | | | |
|---|---|---|---|
| 3,737,292 | 6/1973 | Keck et al. ................................ 65/3 |
| 3,966,889 | * 6/1976 | Kakuta et al. ......................... 95/234 |
| 4,090,871 | 5/1978 | Lebleu et al. ......................... 75/84.5 |
| 4,372,834 | 2/1983 | Barns et al. ....................... 204/157.1 |
| 4,385,915 | 5/1983 | Amelse et al. ......................... 65/3.12 |
| 4,432,951 | 2/1984 | De Schepper et al. . |
| 4,525,332 | 6/1985 | Boateng et al. . |
| 4,578,253 | 3/1986 | Gill et al. . |
| 4,643,110 | 2/1987 | Lisowyj et al. . |
| 4,678,647 | 7/1987 | Lisowyj et al. . |
| 4,710,278 | 12/1987 | Polak et al. . |
| 4,765,805 | * 8/1988 | Wahl et al. .......................... 55/341.1 |
| 4,775,479 | 10/1988 | Shügerl et al. . |
| 4,886,648 | 12/1989 | Menendez et al. . |
| 4,915,919 | 4/1990 | Boateng et al. . |
| 4,942,023 | 7/1990 | De Schepper et al. . |
| 5,051,123 | 9/1991 | Nurmi . |
| 5,069,794 | 12/1991 | Haag et al. . |
| 5,080,837 | 1/1992 | Gyökhegyi et al. ................... 75/84.5 |
| 5,178,334 | 1/1993 | Herbert et al. . |
| 5,190,735 | 3/1993 | Phillips et al. . |
| 5,277,882 | 1/1994 | Vliegen et al. . |

(List continued on next page.)

FOREIGN PATENT DOCUMENTS

| | | |
|---|---|---|
| 0018478 | 4/1980 | (EP) . |
| 785751 | 11/1957 | (GB) . |
| 6001612 | 1/1994 | (JP) . |

OTHER PUBLICATIONS

Perry's Chemical Engineers Handbook, 7ᵗʰ Edition, NY, McGraw–Hill; Section 14–24 to 14–30, 1997.

*Primary Examiner*—Duane S. Smith
(74) *Attorney, Agent, or Firm*—David L. Berdan; Timothy R. Krogh

(57) ABSTRACT

A method is disclosed for recovering germanium from a gaseous mixture which includes a germanium-containing compound in vapor or particulate form, acid in vapor form, and water vapor. The gaseous mixture is contacted with a liquid containing water under conditions effective to dissolve the germanium-containing compound in the liquid. The acidity of the resulting liquid mixture is increased under conditions effective to vaporize the germanium-containing compound. The vaporized germanium-containing compound is contacted with one or more aqueous solutions under conditions effective to dissolve and precipitate the germanium-containing compound in at least one of the one or more aqueous solutions, and the resulting precipitate is separated from the at least one of the one or more aqueous solutions. The methods described herein are particularly well suited for recovering germanium from the waste gases produced during optical waveguide manufacturing processes. Germanium recovered by this method can thereafter be used in the production of semiconductors, optical waveguide fibers and optical components.

37 Claims, 7 Drawing Sheets

U.S. PATENT DOCUMENTS

| | | |
|---|---|---|
| 5,281,255 | 1/1994 | Toy et al. . |
| 5,304,363 | 4/1994 | Beck et al. . |
| 5,520,896 * | 5/1996 | De Graaf et al. ................ 95/234 |
| 5,536,298 * | 7/1996 | Awaji ................................. 95/35 |
| 5,741,469 | 4/1998 | Bhore et al. . |
| 5,785,741 | 7/1998 | Li et al. ................................ 96/4 |
| 5,895,521 * | 4/1999 | Otsuka et al. .................... 95/280 |
| 6,054,104 | 4/2000 | Iankewicz et al. . |
| 6,090,183 * | 7/2000 | Awaji ................................. 95/35 |

* cited by examiner

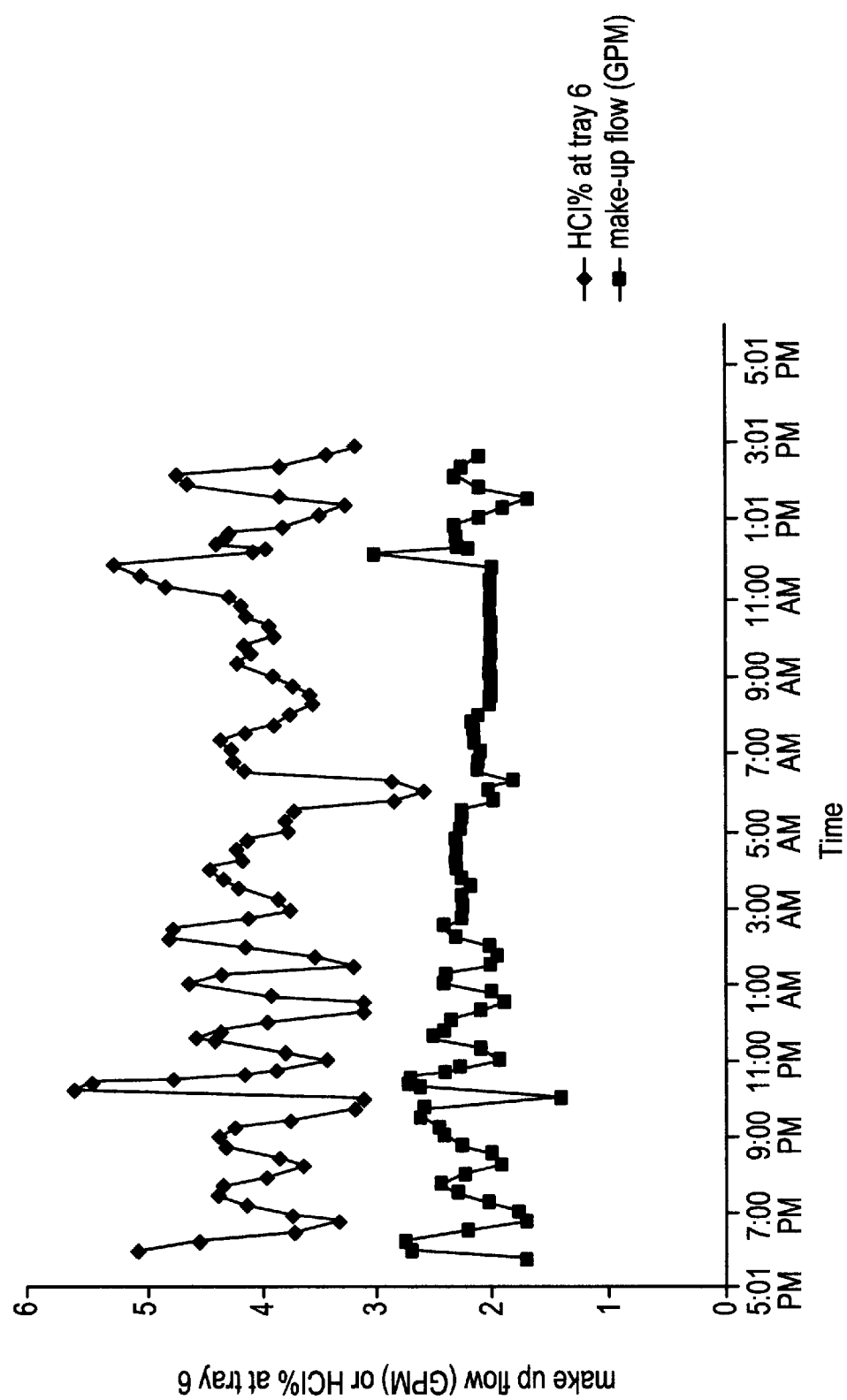

METHODS FOR THE SEPARATION OF COMPOUNDS FROM ACIDIC AQUEOUS SOLUTIONS

FIELD OF THE INVENTION

The subject invention relates, generally, to a method for separating compounds from acidic aqueous solutions and, more particularly, to a method for separating germanium-containing compounds from scrubber acid produced during the manufacture of optical waveguides.

BACKGROUND OF THE INVENTION

In recent times, the use of optical fiber communications has increased dramatically, and the promise of increased signal transmission speed and clarity makes it likely that the use of optical fibers for signal transmission will continue to rise in the future. Therefore, it is likely that the amount of optical components, particularly optical fiber, being manufactured will increase in the future as optical communications systems replace communication systems based on electrical signals. Consequently, the ability reduces the costs associated with the production of optical components and, particularly, optical fiber is and will likely continue to be significant.

Germanium tetrachloride is one of the most expensive ingredients in the manufacture of optical fiber. In the process for making optical fiber, germanium tetrachloride is combusted to produce germanium dioxide which is incorporated in the optical fiber during its manufacture. However, the combustion of germanium tetrachloride is not efficient in the processes presently used to make optical fiber. As a result, a considerable amount of germanium tetrachloride as well as other forms of germanium (e.g., $GeO_2$ particulates that are not incorporated into the optical fiber) is lost in the process, typically in the exhaust gases. Generally, the exhaust gases from the production of optical fiber contain unreacted germanium tetrachloride vapor, germanium dioxide, silicon tetrachloride, silicon dioxide, hydrochloric acid gas, and water vapor, as well as large amounts of gasses found in ambient air (e.g., nitrogen, oxygen, and carbon dioxide). Although the exhaust gas is filtered through a baghouse, this filtration only recovers a fraction of the germanium present in the exhaust gas. After filtration, the exhaust gas is directed to scrubbers which are designed to remove the hydrochloric acid from the exhaust gas. Whatever germanium is contained in the exhaust gasses entering the scrubbers is lost in the scrubber waste acid or is released with the stack gasses from the scrubber operation.

A number of methods have been devised to address the loss of germanium in optical fiber production. In one such method, multivalent cations, such as magnesium (II) ions, were used to precipitate germanium from the scrubber waste acid after neutralization. However, applicants have discovered that not all germanium is captured in the scrubber waste acid. Therefore, even if all of the germanium in the scrubber waste acid could be precipitated using multivalent cations, a significant amount of germanium would, nevertheless, be lost in the stack gasses. Furthermore, it is sometimes undesirable to neutralize the large amount of acid collected by the scrubber as practiced in this method.

A need exists for an effective method of recovering germanium from the exhaust gases produced during optical fiber manufacture. The present invention addresses this need.

SUMMARY OF THE INVENTION

The present invention relates to a method for separating a compound from a mixture which includes water, acid, and the compound dissolved therein. The method includes providing a mixture which includes water, acid, and a compound. The acidity of the mixture is increased under conditions effective to form a vapor of the compound. The vapor is contacted with one or more aqueous solutions under conditions effective to dissolve the vapor and, thereafter, to form a precipitate of the compound in at least one of the one or more aqueous solutions. The method further includes separating the precipitate from at least one of the one or more aqueous solutions.

The present invention also relates to a method for recovering germanium from a gaseous mixture comprising a germanium-containing compound in vapor or particulate form, acid in vapor form, and water vapor. The method includes providing a gaseous mixture which includes a germanium-containing compound in vapor or particulate form, acid in vapor form, and water vapor. The gaseous mixture is contacted with a liquid containing water under conditions effective to dissolve the germanium-containing compound in the liquid. The acidity of the resulting liquid mixture is increased under conditions effective to form a vapor of the germanium-containing compound. The vaporized germanium-containing compound is contacted with one or more aqueous solutions under conditions effective to dissolve the vapor and, thereafter, to form a precipitate of the germanium-containing compound in at least one of the one or more aqueous solutions. The method further includes separating the precipitate from at least one of the one or more aqueous solutions.

In another aspect thereof, the present invention relates to a method for separating a compound from a mixture which includes water, acid, and the compound dissolved therein in an optical waveguide manufacturing process. The method includes providing a mixture comprising water, acid, and a compound, said mixture being a by-product of an optical waveguide manufacturing process, and increasing the acidity of the mixture under conditions effective to form a vapor of the compound. The vapor is contacted with one or more aqueous solutions under conditions effective to dissolve the vapor and, thereafter, to form a precipitate of the compound in at least one of the one or more aqueous solutions, and the precipitate is separated from at least one of the one or more aqueous solutions.

The process of the present invention readily permits recovery of a large fraction of the germanium present in the exhaust gas of an optical waveguide manufacturing process and, thus, decreases the overall cost of the manufacture of optical waveguides.

BRIEF DESCRIPTION OF THE DRAWINGS

FIG. 7 is a graph showing the flow of makeup water and the concentration of HCl in tray 6 (i.e., the uppermost tray) as a function of time during the practice of a continuous mode method according to the present invention.

DETAILED DESCRIPTION OF THE INVENTION

Figure 1:
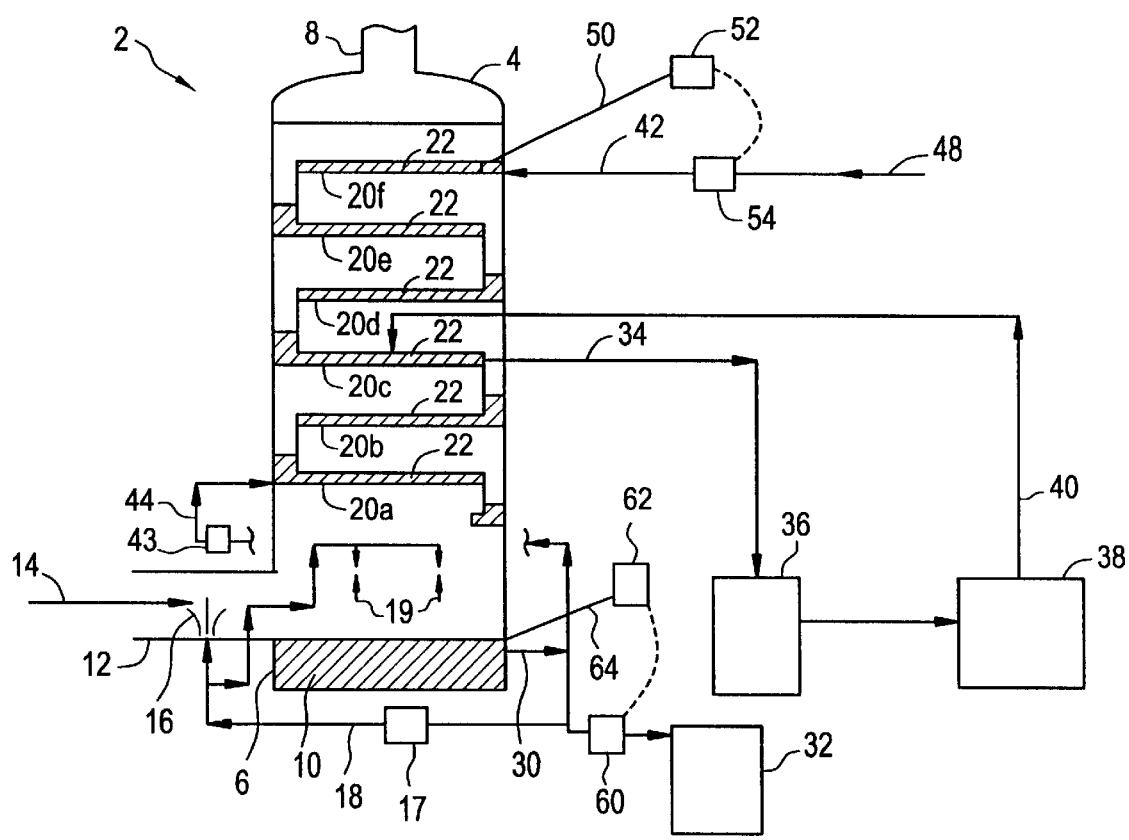
FIG. 1 is a cross-sectional view of an apparatus that can be used in a method according to the present invention.

The present invention relates to a method for separating a compound from a mixture which includes water, acid, and the compound dissolved therein. Preferably, the compound is one which is vaporized at high acid concentrations and is dissolved at low acid concentrations. Furthermore, the compound is preferably one that forms a precipitate at low acid concentrations.

A variety of compounds can be separated using the process of the present invention. Identification of compounds suitable for separation using the method of the present invention is based on a number of factors. First, the compound should be soluble in water or in a water/acid mixture. Second, in the presence of high acid concentrations, the compound should have a fairly high vapor pressure (e.g., about 1–200 torr at the operating temperature of the system (i.e., at about 30–40° C.)). Third, the compound should be capable of being dissolved by an aqueous solution having a lower acid concentration, and, preferably, the compound should precipitate from this aqueous solution having a lower acid concentration. Compounds that can be separated using the method of the present invention from the acid and water mixture in which they are dissolved include, for example, germanium-containing compounds, such as germanium chloride ($GeCl_4$) and germanium bromide ($GeBr_4$); antimony chloride ($SbCl_3$ or $SbCl_5$); and arsenic chloride ($AsCl_3$).

The compound which is to be separated from the acid/water mixture need not remain in the same form throughout the process described herein. For example, it is believed that germanium chloride, in a hydrochloric acid/aqueous environment, is present as an equilibrium mixture of $Ge^{+4}$, $GeO^{+2}$, $GeO_2$, $GeCl^{+3}$, $GeOCl^{+2}$, $GeCl_2^{+2}$, $GeOCl_2^{+2}$, $GeCl_3^+$, and $GeCl_4$. At the high acid concentrations needed to cause the germanium-containing compound to vaporize, it is believed that the equilibrium is shifted to the latter species in the above list and that, because $GeCl_4$ has a high vapor pressure, the germanium-containing compound vaporizes in the form of $GeCl_4$. At lower acid concentrations, the equilibrium is believed to be shifted to the earlier species in the above list and that, because $GeO_2$ has a low solubility in water and water/acid mixtures having low acid concentrations, germanium precipitates in the form of $GeO_2$. Other compounds suitable for separation from mixtures containing water and acid, such as those compounds discussed above, can similarly be expressed in the form of a series of equilibria with a variety of species present at various stages during the process. The use of the phrase "the compound" in the process described in the present application, thus, does not refer only to the compound itself (i.e., the compound originally in the mixture) but also to derivatives of the compound which can be produced from the compound in acidic aqueous environments by equilibrium processes.

Separation according to the present invention involves providing a mixture which includes water, acid, and a compound. Preferably, the acid is hydrochloric acid. The mixture can be a solution which is produced by any suitable means. Generally, the mixture is a by-product of some other industrial process from which it is desirable to remove the compound from the mixture in order to recover the compound (e.g., in cases where the compound is particularly valuable), or in order to prevent release of the compound into the environment (e.g., in cases where the compound is toxic or otherwise harmful to the environment), or both. The mixture can contain other materials (i.e., in addition to the compound, acid, and water). For example, in the case of optical fiber manufacture, the mixture can also contain silicon compounds, e.g., $SiCl_4$ or $SiO_2$. Preferably, the mixture does not contain significant quantities of agents which cause the compound (i.e., the compound itself or one of the species produced by equilibration of the compound, water, and the acid) to precipitate.

The mixture can be provided in a number of ways. For example, the mixture of the compound, acid, and water can be the direct product of a manufacturing process. Alternatively, the product of the manufacturing process can be a gaseous mixture containing, inter alia, water (in vapor form), acid (in vapor form), and the compound (in vapor form or as a liquid or solid particulate dispersed in the water and acid vapor). In the case where the compound is initially present in a gaseous mixture, the mixture described above can be produced by contacting the gaseous mixture with a liquid so that the water vapor, acid vapor, and compound (in vapor or particulate form) are condensed and/or dissolved by the liquid. Generally, the liquid is predominantly water, but it can contain other components, such as acid and the compound. Contact between the liquid and the gaseous mixture is carried out under conditions that are effective to cause the acid and compound contained in the gaseous mixture to become dissolved in the liquid. For example, one particularly efficient way to contact the liquid and the gaseous mixture involves spraying the liquid (e.g., through nozzles, such as the ones used for conventional garden hoses, although the material used to construct the nozzles should be compatible with the liquid, such as, but not limited to, TEFLON® (also known as polytetrafluoroethylene "PTFE") or PVC) into the gaseous mixture. Other effective methods for contacting the liquid and the gaseous mixture include bubbling the gaseous mixture through a sieve plate. Where the gaseous mixture is provided as a continuous feed (e.g., from a combustion process), spraying can be carried out by spraying the liquid from a reservoir into a channel through which the gaseous mixture is fed. The volume of spray and the number and arrangement of nozzles effective to optimize the dissolution of the acid and compound contained in the gaseous mixture is a function of the temperature of the gas, the temperature of the liquid, the flow rate of the gaseous mixture, the cross section of the channel through which the gaseous mixture passes, the composition of the gas and of the liquid, and other factors that will be readily apparent to those of skill in the art.

According to the process of the present invention, once the mixture of acid, water, and compound is provided, the acidity of the mixture is increased under conditions effective to vaporize the compound. Generally, this step is carried out while the mixture is contained in a suitable vessel, such as a sump, a pot, or a flask. When the compound in the mixture is a germanium compound, the concentration of acid in the mixture is preferably increased to from about 16% to about 25%, by weight, preferably, to from about 18% to about 22%, by weight. "By weight", as used here, is meant to refer to the weight of the total mixture, including water and other components which might be contained therein. In a simple version of this process, acid is merely added to the mixture to increase the concentration of acid therein. Where the gaseous mixture is provided as a continuous feed (e.g., from a combustion process), increasing the acid concentration of the liquid can be carried out by simply permitting the liquid to absorb more acid from the gaseous mixture. Alternatively or additionally, the mixture can be heated (e.g., by using an external heating source, or, preferably, simply by using the heat from the incoming gaseous mixture) so that the vapor pressure of the water increases, causing a portion of the water to be removed from the mixture. As the water is removed, the concentration of acid increases. Preferably, heating is carried out so that mostly water and only a small amount of acid is removed from the mixture. As indicated above, the acid concentration is increased under conditions which are effective to cause the compound in the mixture to vaporize. Typically, this is achieved by increasing the acid concentration of the liquid by ensuring good contact between the liquid and the incoming gaseous mixture and, thus, promoting the liquid's absorption of acid from the incoming gaseous mixture. Spraying the liquid into the incoming gaseous mixture (for example, as described above) is the preferred method for ensuring such good contact.

Once the compound is vaporized, the resulting vapor is contacted with one or more aqueous solutions under conditions effective to dissolve and, thereafter, precipitate the compound. Suitable aqueous solutions with which the vapor can be contacted are those which contain low concentrations of acid (i.e., concentrations of acid at which the compound has a low vapor pressure). In the case of germanium compounds in the presence of hydrochloric acid, suitable solutions are those in which the acid concentration is less than about 19%, by weight; preferably, from about 16 to about 18%, by weight; and, more preferably, less than about 15%, by weight.

Contacting is preferably carried out by directing the vapor from the mixture into the aqueous solutions. This can be done by means of pipes, tubes, or other conduits suitable for directing gases, or, alternatively, it can be carried out by placing the aqueous solutions in containers positioned above the vessel in which the concentration of the acid was increased. Where the latter arrangement is employed, as one skilled in the art will recognize, it is desirable to enclose the vessel and containers in a single housing to direct the flow of germanium vapor from the vessel into the aqueous solutions and to prevent it from escaping to the atmosphere.

Particularly suitable containers for carrying out the step of contacting the vapor with the aqueous solutions are those which have a bottom surface with holes therein. As the vapor from the mixture contained in the vessel rises, it passes through the holes disposed in the bottom surface of the container containing the aqueous solution and bubbles or percolates through the aqueous solution, thus making contact therewith. Preferably the size and number of the holes in the bottom of the container containing the aqueous solution and the rate of upward flow of the vapor and other gases from the mixture contained in the vessel are adjusted so that the upward flow through the holes prevents the downward flow of the aqueous solution through the holes. Shallow trays are commonly employed as containers for containing the aqueous solutions. Further details regarding methods for increasing the contact between gases and liquids suitable for use in this aspect of the present invention are described in Perry et al., eds., *Perry's Chemical Engineer's Handbook,* 7th ed., New York: McGraw-Hill, sections 14–24 to 14–30 (1997), which is hereby incorporated by reference.

Although, in principle, the present invention can be practiced with a single container, it is preferable that a plurality containers be employed. In such a preferred embodiment of the present invention, the first container is positioned above the vessel containing the mixture, and a second container is positioned above the first container. Where a third, fourth, fifth, sixth, seventh, and/or eighth container is employed, these containers are preferably positioned one above the other so that they are substantially vertically aligned with the first and second container. In a preferred mode of operation, water vapor which is vaporized from the vessel passes through the holes in the bottom of the containers and percolates through the aqueous solution that is contained therein. Any acid which co-vaporizes with the water becomes dissolved in the aqueous solutions contained in the upper containers, and the acid concentration in each successively higher container decreases such that substantially only water vapor is present above the highest container. Thus, the series of containers form a gradient of acid concentrations. The vapor which is produced by the increased acid concentration in the vessel likewise percolates through the aqueous solutions contained in the series of containers. In the lower containers, the acid concentration is high and only a small fraction of the vapor is dissolved. As the vapor passes through each successive container, it comes into contact with aqueous solutions having progressively decreasing acid concentrations. Thus, as the vapor passes through each successive container, more and more of the vapor is dissolved, and, as a result, each successive container contains more and more of the compound produced by dissolution of the vapor. When the concentration of the compound in the aqueous solutions contained in a particular container reaches a sufficiently high level, the compound precipitates.

The method of the present invention can be run in either a batch mode or in a continuous mode. For example, in batch mode, a gaseous mixture containing water vapor, acid vapor, and the compound in vapor or particulate form is steadily introduced into the vessel where it is sprayed with liquid from the vessel. The resulting mixture enters the vessel where heat causes the water to vaporize along with some acid, thus increasing the concentration of acid in the mixture contained in the vessel. The acid that is vaporized condenses in the aqueous solutions contained in the lower containers, thus causing the acid concentration of aqueous solutions in the lower containers to increase and establishing a gradient of acid concentration which varies inversely with container height. Since predominately water vapor exits from above the highest container and since there is a steady supply of acid in the incoming gas (from the steady inflow of the gaseous mixture), the overall amount of acid in the system slowly increases relative to the amount of water in the system. Thus, although the concentration of acid in each of the containers increases over time, the gradient is maintained, and, at all times during the process, the lower containers have higher acid concentrations than the upper containers. However, as the acid concentration of the system increases, fewer of the aqueous solutions in the containers have sufficiently low acid concentration to cause the vapor to dissolve and precipitate. Eventually, the system becomes saturated with acid, so that none of the aqueous solutions in the containers are capable of dissolving the vapor percolating therethrough, and the vapor is vented to the atmosphere above the highest container. Furthermore, when the system is saturated with acid, the acid concentration of each of the containers is sufficiently high to vaporize any compound contained therein, and this vapor is also lost to the atmosphere above the highest container. Thus, in the batch mode process, the method of the present invention must be periodically stopped, and the containers drained to remove acid and precipitated compound prior to the time when the system becomes saturated with acid.

As indicated above, the method of the present invention can also be run continuously. In this aspect of the present invention, the mixture in the vessel is steadily or intermittently removed so that the acid concentration in the vessel is maintained just above the concentration needed to vaporize the compound. Since the concentration of acid in the vessel is maintained at a constant level, the concentration of acid in each of the aqueous solutions is also maintained at a constant level. Thus, by operating the process in a continuous mode, one can indefinitely maintain a container whose acid concentration is below that needed to dissolve and precipitate the vapor produced by the compound in the high acid environment of the mixture in the vessel. Alternatively or additionally, the concentration of acid in the system can be maintained at a constant level by steadily or intermittently adding makeup water or dilute acid (preferably the former) to the system, preferably via the uppermost container. In either or both cases, the concentration of acid in the vessel or in one or more of the containers, preferably the uppermost container, can be monitored using conventional methods (e.g., using density measurements), and the removal of acid from the vessel or addition of water to the system (e.g., via the uppermost container) can be automatically controlled using the data gathered from the monitoring process.

Irrespective of how the acid concentration in the mixture is increased and irrespective of how the vapor is contacted with the one or more aqueous solutions having sufficiently low acid concentration to dissolve and precipitate the compound, the resulting precipitate from at least one of these containers is separated from the aqueous solution. Separation can be carried out by any suitable process, examples of which include centrifugation, settling, filtering (with or without the use of pressure or suction), or combinations thereof. Where the method of the present invention is carried out using a continuous process, as described above, it can be advantageous to continuously or intermittently separate the precipitated compound from those aqueous solutions having sufficiently low acid concentrations to dissolve and precipitate the compound vapor. This can be done by continuously or intermittently circulating the aqueous solution(s) from the container(s) containing precipitate through, for example, a filter or settling tank and returning the filtrate or supernatant to the system, preferably, to the same container from which it was removed. Alternatively, the aqueous solution(s) or a portion thereof can be removed from the container(s) containing precipitate and separated in batches.

As indicated above, the method of the present invention is particularly well suited for separating germanium from the gaseous effluent produced in the manufacture of optical waveguides, such as optical fibers, planar waveguides, and the like. The method of the present invention is particularly useful for removing germanium-containing compounds in optical waveguide fiber manufacturing processes which involve vapor deposition ("VD"), especially chemical vapor deposition ("CVD"), such as outside vapor deposition ("OVD"), inside vapor deposition (including modified chemical vapor deposition ("MCVD")), and axial vapor deposition. For example, the method of the present invention can be used to remove germanium-containing compounds in the optical waveguide manufacturing processes disclosed in U.S. Pat. No. 3,737,293 to Keck et al., which is hereby incorporated by reference. The germanium recovered by the method of the present invention can be used directly in manufacturing processes where the purity of germanium is not critical, or, it can be purified. As indicated above, the germanium recovered using the method of the present invention is in its oxide form (i.e., $GeO_2$). It can be used in this form, or, if necessary, it can be converted into another form (e.g., $GeCl_4$).

The method of the present invention is further illustrated by reference to FIG. 1, which shows, in cross section, apparatus 2, such as a scrubber, which can be used to carry out the method of the present invention, and, in a preferred embodiment, is part of a manufacturing process for making optical waveguides, such as optical fibers. The apparatus includes a housing 4 which includes a vessel (e.g., sump 6) and top vent 8. Sump 6 contains a liquid mixture 10 of acid, water, and a germanium compound. In communication with sump 6 is inlet 12, through which a gaseous mixture 14 is delivered to sump 6, for example, from the exhaust manifold used in a vapor deposition process to make optical fiber preforms. Before entering sump 6, the gaseous mixture can be contacted with spray 16 of liquid mixture 10, which is drawn from sump 6, for example via pump 17, and delivered to a spray nozzle via conduits 30 and 18. Alternatively or additionally, the gaseous mixture can be contacted with spray 19 of liquid mixture 10 while in the space above sump 6. Gaseous mixture 14 becomes dissolved by spray 16 and/or spray 19 and enters sump 6 as a solution rich in acid and germanium compounds. Furthermore, because gaseous mixture 14 is typically hot, a significant amount of spray 16 and/or spray 19 is evaporated, which in turn cools gaseous mixture 14.

Apparatus 2 also includes a plurality of containers (e.g., trays 20a–20f) which are positioned above sump 6. These trays contain aqueous solutions 22 that are produced by vaporizing the water and acid present in liquid mixture 10 in sump 6 using the heat from gaseous mixture 14. Since the water has a lower boiling point than the acid, aqueous solutions 22 contained in trays 20a–20f contain increasing amounts of water and decreasing amounts of acid. In this manner a gradient of acid concentration is set up in trays 20a–20f, and the acid concentration in sump 6 increases as water vapor exits apparatus 2 through vent 8.

Figure 2:
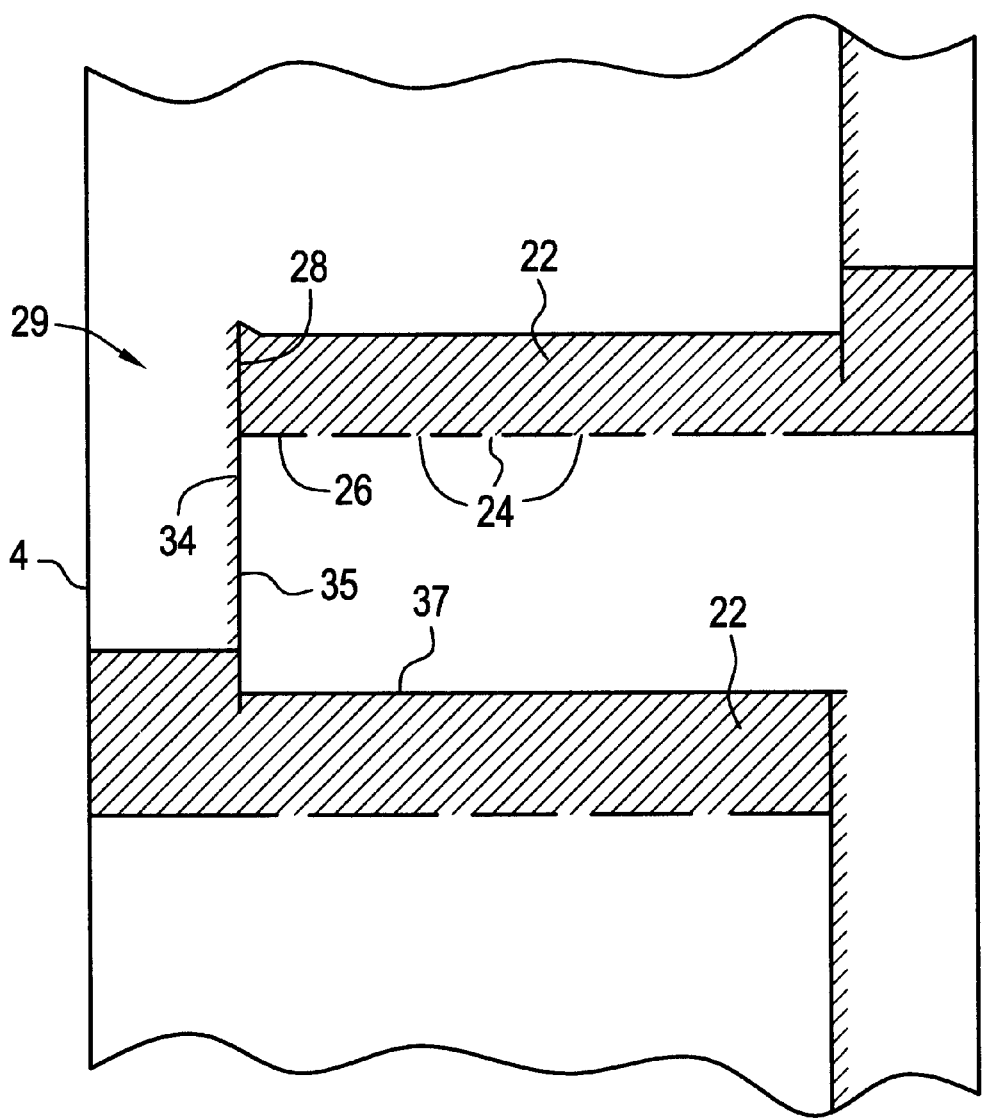
FIG. 2 is a cross-sectional view of a container that can be used for containing aqueous solutions in the practice of a method according to the present invention.

Trays 20a–20f can have any suitable form or shape so long as they are capable of containing aqueous solutions 22. However, to maximize the efficiency of contacting water vapor and gaseous acid produced by heating liquid mixture 10 in sump 6 with the aqueous solutions 22 in trays 20a–20f, it is preferred that trays 20a–20f have a plurality of holes 24 in bottom surface 26, as shown in FIG. 2. Flat-bottomed trays that include bottom surface 26 having holes 24 therethrough, and weirs 28 to maintain the level of the aqueous solution contained therein have been found to be particularly effective. Excess solution 34 flows over weir 28 and down to the next lower tray. Preferably, excess solution 34 is directed by downcomer 29, commonly formed between wall 35 and housing 4, to solution 22 in the next lower tray. As shown in FIG. 2, wall 35 preferably extends below liquid level 37 to prevent the gaseous acid produced by heating liquid mixture 10 in sump 6 from bypassing holes 24 in bottom surface 26 and forces the gaseous acid produced by heating liquid mixture 10 in sump 6 to contact aqueous solution 22.

Returning now to FIG. 1, as the concentration of acid in sump 6 increases to a value of about 23% (by weight), the germanium compound contained in liquid mixture 10 takes the form of $GeCl_4$ which, being volatile, vaporizes to form a vapor. The vapor contacts and passes through aqueous solutions 22 contained in trays 20a–20f. As explained above, the concentration of acid in trays 20a–20f decreases as one goes from lowermost tray 20a to uppermost tray 20f. Typical acid concentration values for aqueous solutions 22 contained in trays 20a, 20b, 20c, 20d, 20e, and 20f are 10–23%, 5–19%, 3–19%, 2–18%, 1–17%, and 0–12%, respectively. The acid concentration value for liquid mixture 10 in sump 6 is approximately 10–23%. Generally, when the process is first started, the acid concentration values tend to approach the lower of these numbers. After apparatus 2 is in operation for several hours, the acid concentrations in sump 6 and on each of trays 20a–20f increase towards the higher number. At these latter values, germanium compound in sump 6 and in trays 20a and 20b is converted to the volatile $GeCl_4$, whereas, in trays 20c–20f, $GeCl_4$ vapor is dissolved and converted to insoluble $GeO_2$, which then precipitates. If permitted to operate indefinitely in the above described manner, the system would saturate with acid (i.e., each of trays 20a–20f and sump 6 would have acid concentrations above 23%). At these concentrations, the $GeCl_4$ vapor produced in sump 6 would not be dissolved on any of trays 20a–20f and would be lost in vapor form through vent 8.

Accordingly, prior to reaching this condition, the amount of acid in the system must be reduced. This can be done by operating the system in a batch process, where, from time to time, the entire process is stopped, each of trays 20a–20f and sump 6 are drained, and the aqueous solutions 22 from trays 20a–20f are filtered to recover precipitated germanium. One of skill in the art will recognize, however, that the precipitated solids can be removed from the trays periodically prior to stopping the batch mode process.

Alternatively, saturation of the system with acid can be prevented by removing, intermittently or continuously, a small portion of liquid mixture 10 from sump 6, for example, through conduit 30 to tank 32. In a preferred embodiment, removal of liquid mixture 10 from sump 6 can be regulated by valve 60, which can be controlled by sensor 62 and probe 64, which detects the acid concentration and/or liquid level of liquid mixture 10 in sump 6. Liquid mixture 10 is removed via conduit 30 at such a rate that the acid concentration of liquid mixture 10 remaining in sump 6 is maintained at about 22–23%. Since the acid concentration in sump 6 is high, germanium that enters the sump through inlet 12 is immediately volatilized in the form of $GeCl_4$; therefore, little if any germanium is present in liquid mixture 10 that is removed via conduit 30. To prevent clogging the system with precipitated germanium, especially in the case where the system is operated continuously, it is advantageous to remove the precipitated germanium from one or more of trays 20a–20f. If the system is operated so that the acid concentration of liquid mixture 10 in sump 6 is maintained constant (e.g., at about 22–23%), the concentration of acid in each of trays 20a–20f likewise remains constant. Thus, precipitation would be expected to occur primarily in one of the trays (i.e., in a tray that has a low enough acid concentration to induce dissolution of $GeCl_4$ vapor and conversion to $GeO_2$). In the system shown in FIG. 1, this is preferably tray 20c, which has an operating acid concentration of about 3–19%. The aqueous solution in tray 20c is either intermittently or continuously removed from tray 20c, for example through conduit 34, and delivered to a device or a plurality of devices for separating solids from liquids, such as settling chamber 36 and filter 38. The filtrate from filter 38 is then returned to apparatus 2, preferably to tray 20c, for example, via conduit 40. Alternatively the aqueous solution may be removed from tray 20b, instead of tray 20c, and the filtrate from filter 38 is then returned to tray 20b. In removing the aqueous solution from the collecting tray and returning the filtrate to the collecting tray, the mass flow rate of stream 34 should be the same as stream 40.

Whether the system is operated in continuous mode or batch mode, water vapor leaves apparatus 2 via top vent 8. Therefore, it is advantageous to introduce makeup liquid 48, such as water or a water/acid mixture (preferably the former), to the top tray to maintain the concentrations of acid on trays 20a–20f constant. As shown in FIG. 1, this can be effected using conduit 42, which carries makeup liquid 48 to top tray 20f. In a preferred embodiment, the addition of makeup liquid 48 to top tray 20f is controlled, for example using probe 50 which is coupled to sensor 52, which, in turn controls valve 54, which regulates flow of makeup liquid 48 via conduit 42. Also, by introducing makeup liquid 48 to top tray 20f, any $GeO_2$ that was either vaporized or entrained to an upper tray is brought down to a lower tray, where it would be removed from the system (e.g., by filtering in the case where it flowed down to tray 20b) or where it would be converted to $GeCl_4$ vapor by the higher acid concentrations of lower tray 20a and/or sump 6 and then dissolved by the aqueous solution in tray 20b.

Under certain conditions, for example, those in which preventing release of acid from top vent 8 is very important, it may be desirable to ensure that at least one of trays 20a–20f contains some aqueous solution. Since the presence of aqueous solution in trays 20a–20f is dependent upon conditions effective to vaporize water, were these conditions to fail and were spray 16 and/or spray 19 to be incapable of dissolving all of the acid in gaseous mixture 14, some gaseous acid would escape from the system via top vent 8. To prevent this occurrence, a portion of liquid mixture 10 can be circulated via pump 43 to lowermost tray 20a, for example, through conduit 44. It this way, the presence of at least some aqueous solution in the path between inlet 12 and top vent 8 can be assured.

The present invention is further illustrated by the following examples.

EXAMPLES

Example 1

Batch Mode

Figure 3:
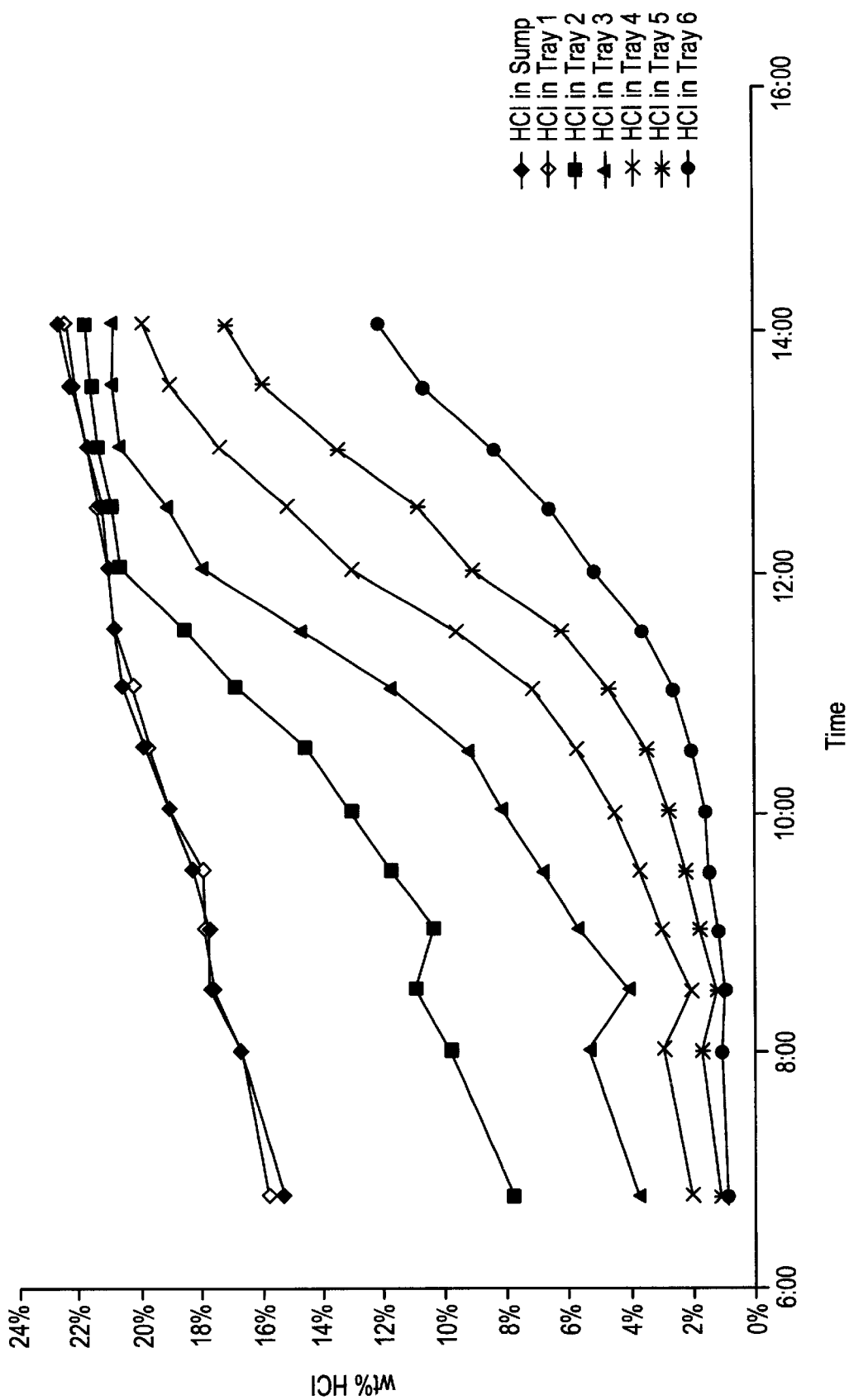
FIG. 3 is a graph showing the concentration of acid in various trays as a function of time during the practice of a batch mode method according to the present invention.
Figure 4:
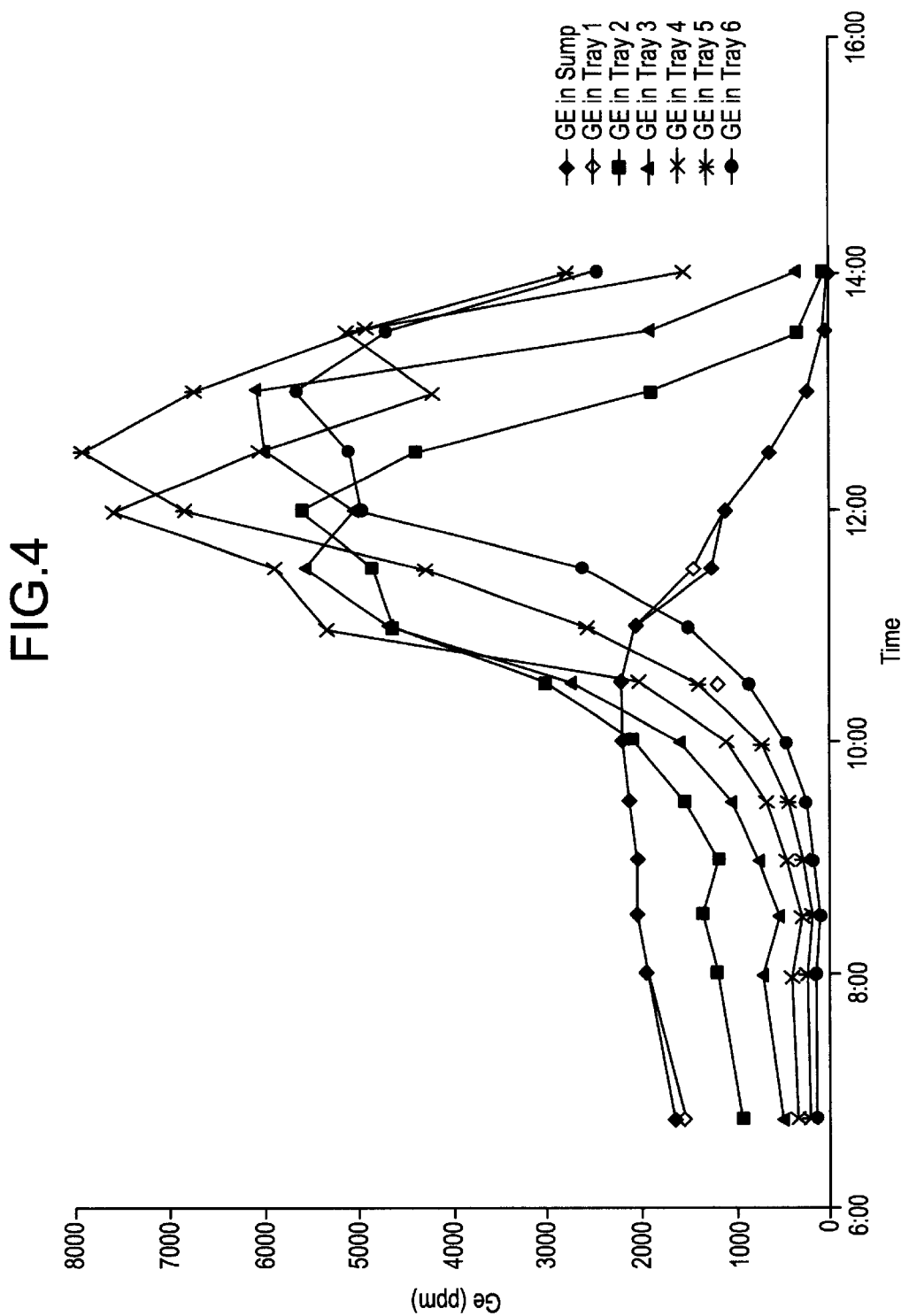
FIG. 4 is a graph showing the concentration of germanium in various trays as a function of time during the practice of a batch mode method according to the present invention.
Figure 5:
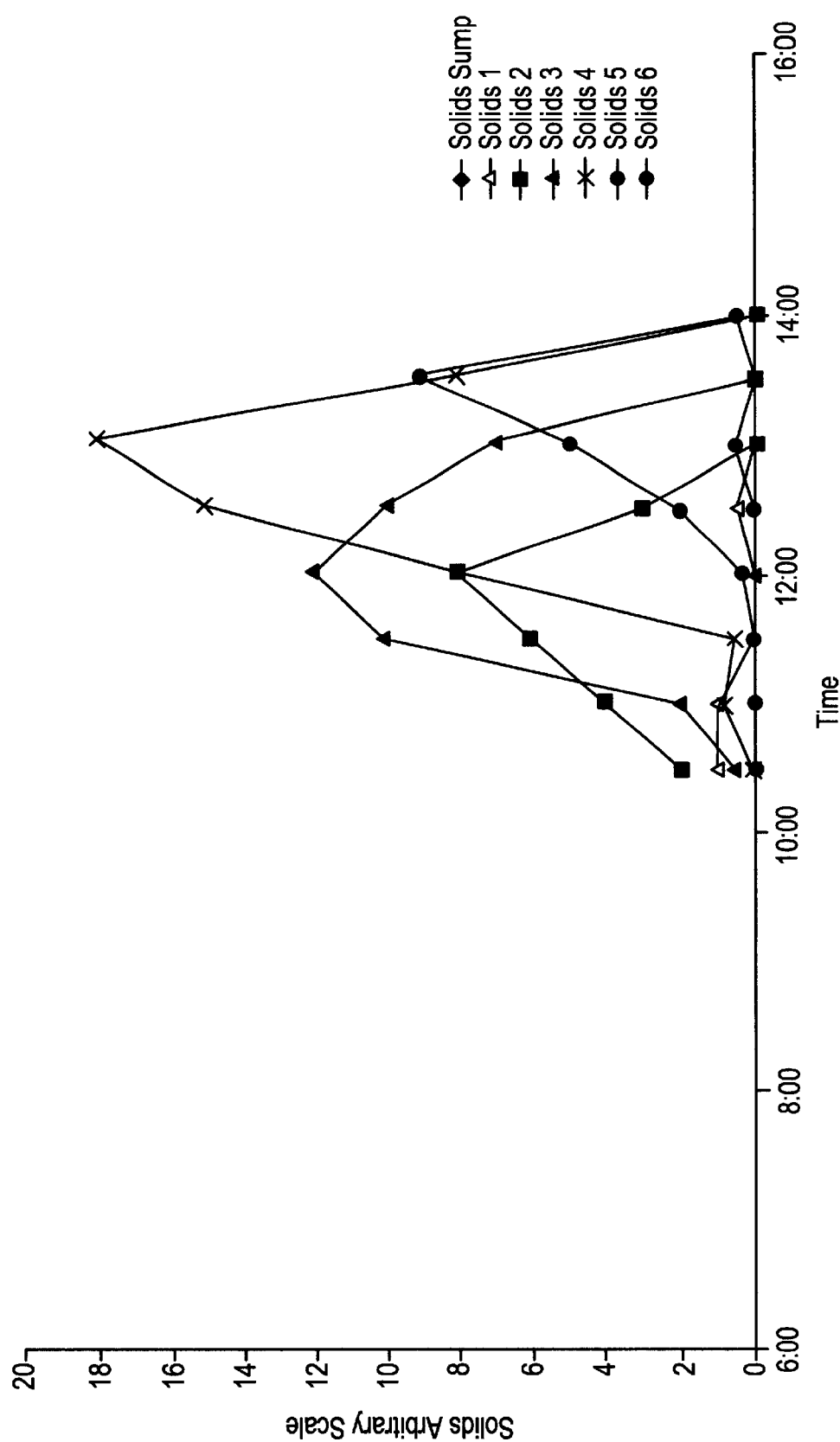
FIG. 5 is a graph showing the quantity of solids in various trays as a function of time during the practice of a batch mode method according to the present invention.

A six-tray HCl scrubber similar to the one depicted in FIG. 1 was adapted to receive exhaust products from the laydown step of an OVD optical waveguide manufacturing process and was run in batch mode (i.e., without removing sump acid to dirty acid tank 32 and without removing solids via conduit 34) for about eight hours. In this experiment, liquid from the sump was circulated to tray 1 (20a in FIG. 1, i.e., the lowest tray), as described above. Air flow was at 8000 dry standard cubic feet per minute ("DSCFM"); Ge flow was 1.0 lbs/hr; HCl flow was 35 lbs/hr; and makeup water flow was 1.2 gal/min. FIG. 3 shows the concentration of hydrochloric acid on each of the six trays and in the sump as a function of time. FIG. 4 shows the concentration of germanium on each tray and in the sump as a function of time. Together, FIGS. 3 and 4 demonstrate that, as the acid concentration in the sump reached 18%, the germanium began to volatilize from the sump and accumulate in the upper trays. When the acid concentration reached about 20%, this volatilization accelerated significantly. As a result the concentration of germanium in the sump decreased while the concentration of germanium in the upper trays rapidly increased. As time progressed, the concentration of germanium in all trays decreased, which, it is believed, is due to revaporization of the germanium caused by increasing acid concentrations on all trays (i.e., system saturation). During the experiment, samples were removed from the various trays and from the sump at regular intervals and analyzed for germanium solids. The quantity of solids on each tray and in the sump at various times is shown in FIG. 5. The solids content is shown on an arbitrary scale ranging from 0 to 18, where 18 represents the highest observed germanium solids value. FIG. 5 demonstrates that when a certain concentration of germanium is exceeded on a particular tray, germanium will precipitate.

Example 2

Continuous Mode

Figure 6:
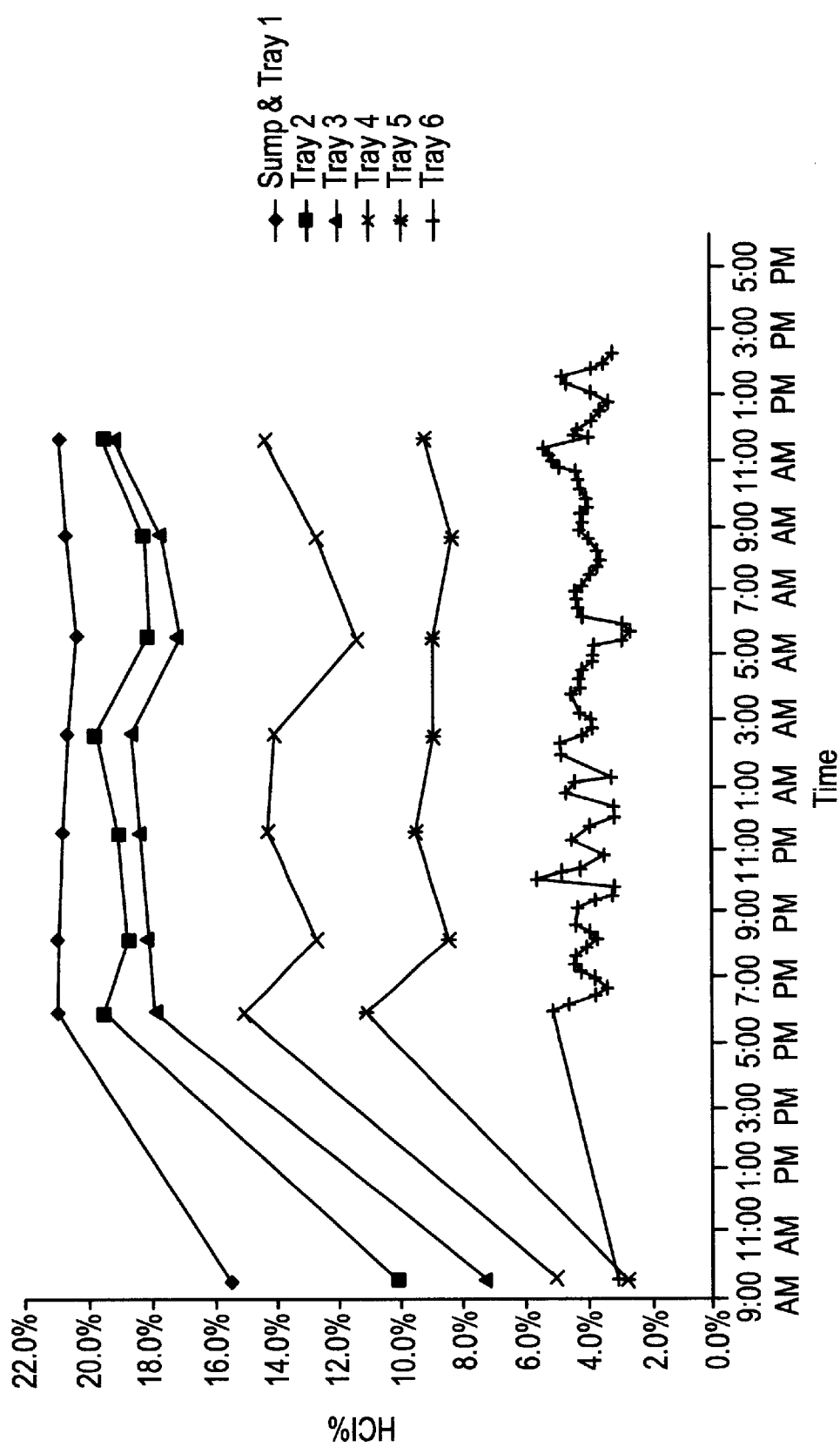
FIG. 6 is a graph showing the concentration of hydrochloric acid on each of the six trays and in the sump as a function of time during the practice of a continuous mode method according to the present invention.

A six-tray HCl scrubber similar to the one depicted in FIG. 1 was adapted to receive exhaust products from the vapor deposition laydown step of an optical waveguide manufacturing process and was run in continuous mode (i.e., with the removal of sump acid to tank 32 and with removal of solids via conduit 34) for about 22 hours from 5 pm to 3 pm the following day. In this experiment, liquid from the sump was circulated to tray 1 (20a in FIG. 1, i.e., the lowest tray), as described above. Air flow was at 8000–12000 DSCFM; Ge flow was 0–1.5 lbs/hr; and HCl flow was 10–40 lbs/hr. A probe, sensor, and valve were used to regulate the flow of makeup water to the top tray (referred to here as tray 6) and the rate of removal of acid from the sump to the dirty acid tank. The makeup water flow varied and was greater than 1.5 gal/min. The rate of removal of acid from the sump to the dirty acid tank was close to the flow of makeup water. FIG. 6 shows the concentration of hydrochloric acid on each of the six trays and in the sump as a function of time. FIG. 6 demonstrates that, after an initial equilibration period (i.e., 9 am to 6 pm), the acid concentration on all trays can be maintained substantially constant by regulating the flow of make-up water to the top tray using the method of the present invention. FIG. 7 shows the flow of makeup water as a function of time and compares this flow to the concentration of HCl in tray 6 (20f of FIG. 1, i.e., the uppermost tray) as measured using the probe and sensor. When $GeO_2$ begin to form in solution 22 on tray 3 (20e in FIG. 1), solution 22 is pumped from tray 3 and filtered to remove the $GeO_2$ and the filtered solution is pumped back to tray 3. Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method for separating a compound from a mixture comprising water, acid, and the compound dissolved therein, said method comprising the steps of:

providing a mixture comprising water, acid, and a compound;

increasing the acidity of the mixture under conditions effective to form a vapor of the compound;

contacting the vapor with one or more aqueous solutions under conditions effective to dissolve the vapor and, thereafter, to form a precipitate of the compound in at least one of the one or more aqueous solutions; and separating the precipitate from at least one of the one or more aqueous solutions.

2. A method according to claim 1, wherein the compound in said providing step comprises a germanium-containing compound.

3. A method according to claim 1, wherein the acid in said providing step comprises hydrochloric acid.

4. A method according to claim 1, wherein said providing step comprises:

contacting a gaseous mixture containing acid vapor, water vapor, and the compound in vapor or particulate form with a liquid comprising water under conditions effective for the liquid to dissolve the acid and compound.

5. A method according to claim 4, wherein said step of contacting a gaseous mixture containing acid vapor, water vapor, and the compound in vapor or particulate form with a liquid comprising water comprises the step of:

spraying the liquid into the gaseous mixture.

6. A method according to claim 4, wherein the gaseous mixture in said step of contacting a gaseous mixture containing acid vapor, water vapor, and the compound in vapor or particulate form with a liquid comprising water comprises exhaust gas from an optical waveguide production process.

7. A method according to claim 1, wherein the mixture comprising water, acid, and a compound is contained in a vessel and wherein said contacting step is carried out with a first aqueous solution contained in a first container positioned above the vessel.

8. A method according to claim 7, wherein the first container has a bottom surface with holes therein and wherein said contacting step comprises the step of:

passing the vapor through the holes under conditions effective to prevent the aqueous solution from passing downwardly though the holes.

9. A method according to claim 7, further comprising the step of:

contacting the vapor with a second aqueous solution contained in a second container positioned above the first container.

10. A method according to claim 9, wherein the first container is the lowermost container and the second container is the uppermost container and wherein said method further comprises the step of:

contacting the vapor with one or more intermediate aqueous solutions, each contained in one or more intermediate containers positioned above the first container and below the second container, wherein the precipitate forms in at least one of the intermediate aqueous solutions.

11. A method according to claim 1, wherein said increasing step comprises the step of:

removing the water from the mixture.

12. A method according to claim 1, wherein said increasing step results in an acid concentration of from about 16% to about 25% by weight.

13. A method according to claim 1, wherein said increasing step results in an acid concentration of from about 18% to about 22% by weight.

14. A method according to claim 1, wherein at least one of the one or more aqueous solutions comprises an acid concentration of less than about 19% by weight.

15. A method according to claim 1, wherein at least one of the one or more aqueous solutions comprises an acid concentration of less than about 15% by weight.

16. A method according to claim 1, wherein said step of separating the precipitate from the aqueous solution comprises filtration.

17. A method according to claim 1, wherein said method is carried out continuously.

18. A method according to claim 1, wherein said method is carried out in batch mode.

19. A method for recovering germanium from a gaseous mixture comprising a germanium-containing compound in vapor or particulate form, acid in vapor form, and water vapor, said method comprising the steps of:

provxiding a gaseous mixture comprising a germanium-containing compound in vapor or particulate form, acid in vapor form, and water vapor;

contacting the gaseous mixture with a liquid comprising water under conditions effective to form a liquid mixture comprising the germanium-containing compound;

increasing the acidity of the liquid mixture under conditions effective to form a vapor of the germanium-containing compound;

contacting the vapor with one or more aqueous solutions under conditions effective to dissolve the vapor and, thereafter, to form a precipitate of the germanium-containing compound in at least one of the one or more aqueous solutions; and separating the precipitate from at least one of the one or more aqueous solutions.

20. A method according to claim 19, wherein the acid in said providing step comprises hydrochloric acid.

21. A method according to claim 19, wherein said contacting step comprises the step of:

spraying the liquid into the gaseous mixture.

22. A method according to claim 19, wherein the gaseous mixture in said contacting step comprises exhaust gas from an optical waveguide production process.

23. A method according to claim 19, wherein the liquid mixture is contained in a vessel and wherein said contacting step is carried out with one or more aqueous solutions each contained in a container positioned above the vessel.

24. A method according to claim 23, wherein at least one of the one or more aqueous solutions is contained in a container having a bottom surface with holes therein and wherein said contacting step comprises the step of:

passing the vapor through the holes under conditions effective to prevent the aqueous solution contained therein from passing downwardly though the holes.

25. A method according to claim 19, wherein said increasing step comprises the step of:

removing the water from the mixture.

26. A method according to claim 19, wherein said increasing step results in an acid concentration of from about 16% to about 25% by weight.

27. A method according to claim 19, wherein said increasing step results in an acid concentration of from about 18% to about 22% by weight.

28. A method according to claim 19, wherein at least one of the one or more aqueous solutions comprises an acid concentration of less than about 19% by weight.

29. A method according to claim 19, wherein at least one of the one or more aqueous solutions comprises an acid concentration of less than about 15% by weight.

30. A method according to claim 19, wherein said step of separating the precipitate from the aqueous solution comprises filtration.

31. A method according to claim 19, wherein said method is carried out continuously.

32. A method according to claim 19, wherein said method is carried out in a batch mode.

33. A method for separating a compound from a mixture comprising water, acid, and the compound dissolved therein in an optical waveguide manufacturing process, said method comprising the steps of:

providing a mixture comprising water, acid, and a compound, said mixture being a by-product of an optical waveguide manufacturing process;

increasing the acidity of the mixture under conditions effective to form a vapor of the compound;

contacting the vapor with one or more aqueous solutions under conditions effective to dissolve the vapor and, thereafter, to form a precipitate of the compound in at least one of the one or more aqueous solutions; and separating the precipitate from at least one of the one or more aqueous solutions.

34. A method according to claim 33, wherein the optical waveguide process produces an optical fiber.

35. A method according to claim 33, further comprising a chemical vapor deposition process to produce the compound dissolved.

36. A method according to claim 35, wherein the chemical vapor deposition process is an outside vapor deposition process.

37. A method according to claim 33, wherein the compound is a germanium-containing compound.

\* \* \* \* \*